(12) United States Patent
Anderson et al.

(10) Patent No.: US 8,521,315 B2
(45) Date of Patent: Aug. 27, 2013

(54) APPARATUSES, METHODS AND COMPUTER-READABLE STORAGE MEDIUMS FOR BROWSING AND SELECTING A MULTIMEDIA OBJECT

(75) Inventors: Michael J. Anderson, Vancouver (CA); Michael McFarland, Edmonton (CA); George Kovacs, Vancouver (CA)

(73) Assignee: McKesson Financial Holdings, Hamilton (BM)

( * ) Notice: Subject to any disclaimer, the term of this patent is extended or adjusted under 35 U.S.C. 154(b) by 893 days.

(21) Appl. No.: 12/626,397

(22) Filed: Nov. 25, 2009

(65) Prior Publication Data

US 2010/0131089 A1   May 27, 2010

Related U.S. Application Data

(60) Provisional application No. 61/118,154, filed on Nov. 26, 2008.

(51) Int. Cl.
*G06F 17/00* (2006.01)

(52) U.S. Cl.
USPC ............................................ 700/94; 704/260

(58) Field of Classification Search
None
See application file for complete search history.

(56) References Cited

U.S. PATENT DOCUMENTS

| | | | |
|---|---|---|---|
| 5,790,644 A * | 8/1998 | Kikinis .................... | 379/114.19 |
| 5,884,262 A * | 3/1999 | Wise et al. ................. | 704/270.1 |
| 6,122,351 A * | 9/2000 | Schlueter et al. ........ | 379/106.02 |
| 6,249,809 B1 * | 6/2001 | Bro .............................. | 709/217 |
| 6,535,588 B1 * | 3/2003 | Norcott et al. ............. | 379/91.01 |
| 7,047,235 B2 * | 5/2006 | Yang et al. .................... | 707/661 |
| 7,412,459 B1 * | 8/2008 | Johnson et al. ....................... | 1/1 |
| 7,420,472 B2 * | 9/2008 | Tran ........................... | 340/573.1 |
| 7,502,560 B2 * | 3/2009 | Komori ......................... | 396/310 |
| 7,555,436 B2 * | 6/2009 | Brown ............................... | 705/2 |
| 2006/0064499 A1 * | 3/2006 | Sharma et al. ................ | 709/230 |
| 2007/0293745 A1 * | 12/2007 | McCutcheon et al. ........ | 600/323 |
| 2008/0235278 A1 * | 9/2008 | Piepenbrink et al. ...... | 707/104.1 |

* cited by examiner

*Primary Examiner* — Curtis Kuntz
*Assistant Examiner* — Thomas Maung
(74) *Attorney, Agent, or Firm* — Alston & Bird LLP

(57) ABSTRACT

An apparatus is provided that includes a processor and a memory storing executable instructions that in response to execution by the processor cause the apparatus to at least perform a number of functions. The functions include selecting or receiving selection of a multimedia object including an associated identifier, and generating one or more audio tracks of audio tones representing the identifier. The multimedia object is presentable by a computing apparatus, and the audio track(s) collectively form an album for the multimedia object. The functions also include directing a transfer of the album including the audio track(s) to a media player for subsequent playback of the audio track(s). The computing apparatus is configured to pickup the audio tones of the audio track(s) during the playback, interpret the audio tones to identify the multimedia object from the identifier represented by the audio tones, and access and present the identified multimedia object.

9 Claims, 7 Drawing Sheets

APPARATUSES, METHODS AND COMPUTER-READABLE STORAGE MEDIUMS FOR BROWSING AND SELECTING A MULTIMEDIA OBJECT

CROSS-REFERENCE TO RELATED APPLICATIONS

The present application claims priority to U.S. Provisional Patent Application No. 61/118,154, entitled: Apparatuses, Methods and Computer-Readable Storage Mediums for Browsing and Selecting a Multimedia Object, filed on Nov. 26, 2008, the content of which is incorporated herein by reference.

FIELD OF THE INVENTION

The present invention generally relates to user interface and methods for interacting with a computer system, and more particularly, to a user interface and method for browsing and selecting a multimedia object, such as a medical-image record.

BACKGROUND OF THE INVENTION

Many fields generate, store and interact with multimedia objects. One such field is the field of medical imaging in which images of one or more parts of the human body, or data representing one or more conditions of one or more parts of the human body that may be visually represented (generally referred to as an image), are created for clinical purposes. Images for particular patients (generally or those created in response to a particular event) may be collected into medical-image records. These records have traditionally been stored in hard copy in a physical repository at a hospital or other medical facility. With the proliferation of computing technology, however, more of these records are being digitally stored in soft copy in a digital repository or database (that may be located at a hospital or other medical facility), which may be access-restricted to particular clinicians (who may be associated with a hospital or other medical facility).

Existing techniques exist for browsing, selecting and presenting digital medical-image records. As such records may be quite large in size, and are often subject to strict access control due to the sensitive nature of the information contained in the records, existing techniques for browsing, selecting and presenting records have focused on fixed workstations located proximate to or within a secure network including the digital repository or database storing the record. Although such techniques for accessing these records may have advantages in storage and access-control, they also have drawbacks as compared to providing a more mobile technique for browsing and selecting records.

SUMMARY OF THE INVENTION

In light of the foregoing background, exemplary embodiments of the present invention provide improved apparatuses, methods and computer-readable storage mediums for browsing and selecting multimedia objects, such as medical-image records ("exemplary" as used herein referring to "serving as an example, instance or illustration"). Exemplary embodiments of the present invention include a media player that permits, or extends use of legacy media players to permit, browsing and selection of multimedia objects (e.g., medical-image records) stored external to the respective media players. These selected objects may then be accessed from their external storage locations. Exemplary embodiments of the present invention therefore provide mobility in browsing and selection of multimedia objects; and by accessing records from external storage, may maintain security measures that may be applied at that external storage.

According to one aspect of exemplary embodiments of the present invention, an apparatus is provided that includes a processor and a memory storing executable instructions that in response to execution by the processor cause the apparatus to at least perform a number of functions. The functions include selecting or receiving selection of a multimedia object including an associated identifier that may include one or more characters, and generating one or more audio tracks of audio tones (e.g., representing the identifier. The tones may comprise, for example, dual-tone multi-frequency (DTMF) tones one or more of which are associated with each character of the identifier.

The multimedia object (e.g., medical-image record for a patient) is presentable by a computing apparatus, and the audio track(s) collectively form an album for the multimedia object. The functions also include directing a transfer of the album including the audio track(s) to a media player (separate from the computing apparatus) for subsequent playback of the audio track(s), where the multimedia object being is stored external to the media player and accessible to the computing apparatus. The computing apparatus in this instance is configured to pickup the audio tones of the audio track(s) during the playback, interpret the audio tones to identify the multimedia object from the identifier represented by the audio tones, and access and present the identified multimedia object.

According to this aspect, the memory may also store executable instructions that in response to execution by the processor cause the apparatus to further add, to each of the audio track(s), a metadata tag including information related to the multimedia object. In instances in which the multimedia object is a medical-image record for a patient, for example, the information related to the object may include information related to the medical-image record or patient. Also when metadata tag(s) are added to the audio tracks, directing transfer of the album may include directing transfer of the audio track(s) and added metadata tags to the media player. The media player may be thereby enabled to present a user interface displaying the information included in the tag to facilitate selection of the album by a user of the media player, where selection of the album directing playback of the audio track(s) by the media player.

According to another aspect of exemplary embodiments of the present invention, a similar apparatus including a processor and memory storing executable instructions may be caused to perform functions including receiving signals corresponding to audio tones of one or more audio tracks that collectively form an album for a multimedia object that includes an associated identifier. The audio track(s) represent the identifier of the multimedia object. The audio tones are received during playback of the audio track(s) by a separate media player storing the audio track(s), but in which the multimedia object is stored external to the media player. The audio tones are received from an audio sensor configured to pickup the audio tones and generate the corresponding signals. In this regard, the functions also include interpreting the signals corresponding to the audio tones to identify the multimedia object from the identifier represented by the audio tones, and directing presentation of the identified multimedia object.

As indicated above and explained below, exemplary embodiments of the present invention may solve problems identified by prior techniques and provide additional advantages.

BRIEF DESCRIPTION OF THE DRAWINGS

Figure 1:
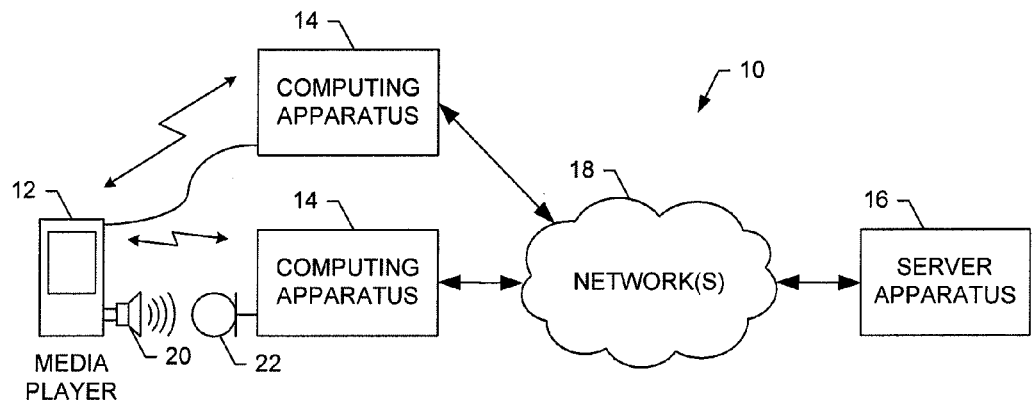
Figure 2:
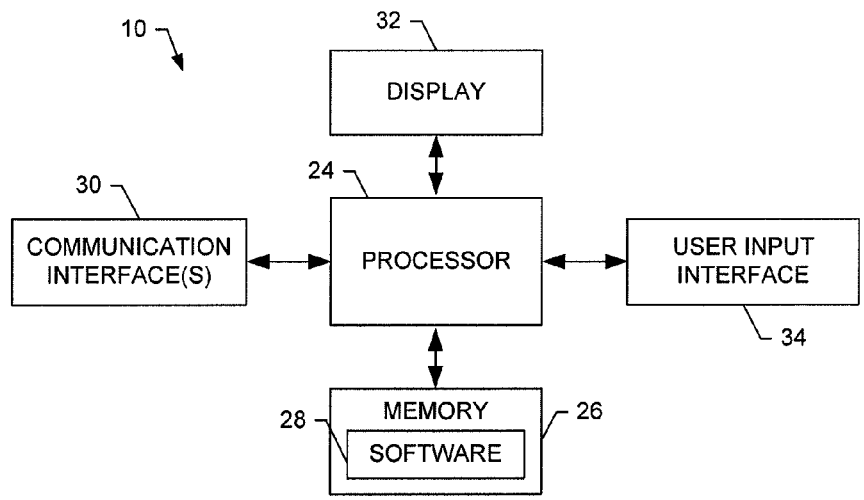
Figure 3:
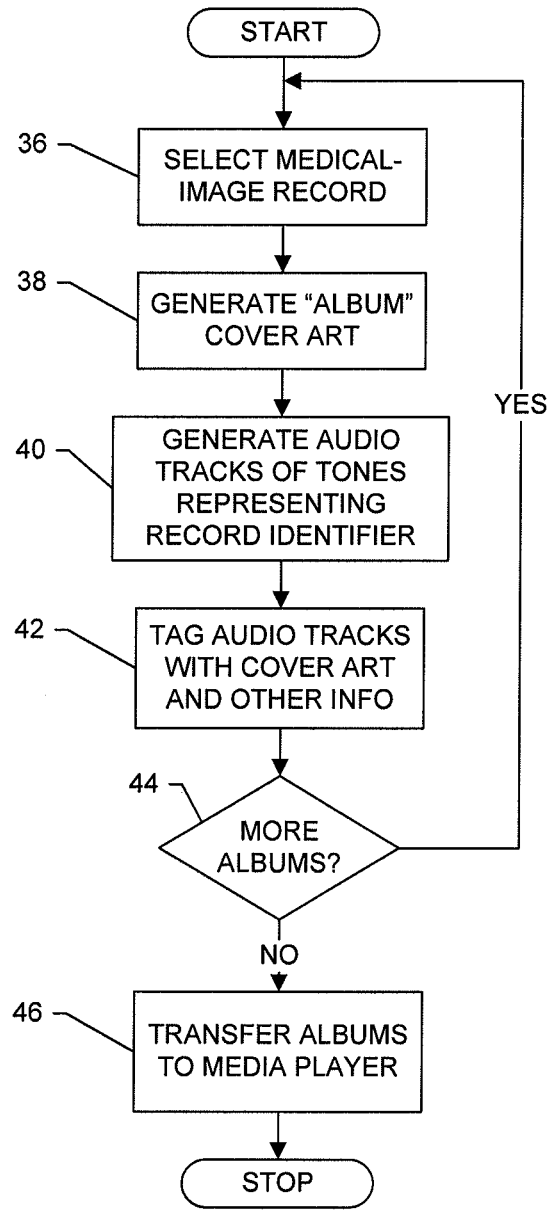
Figure 4:
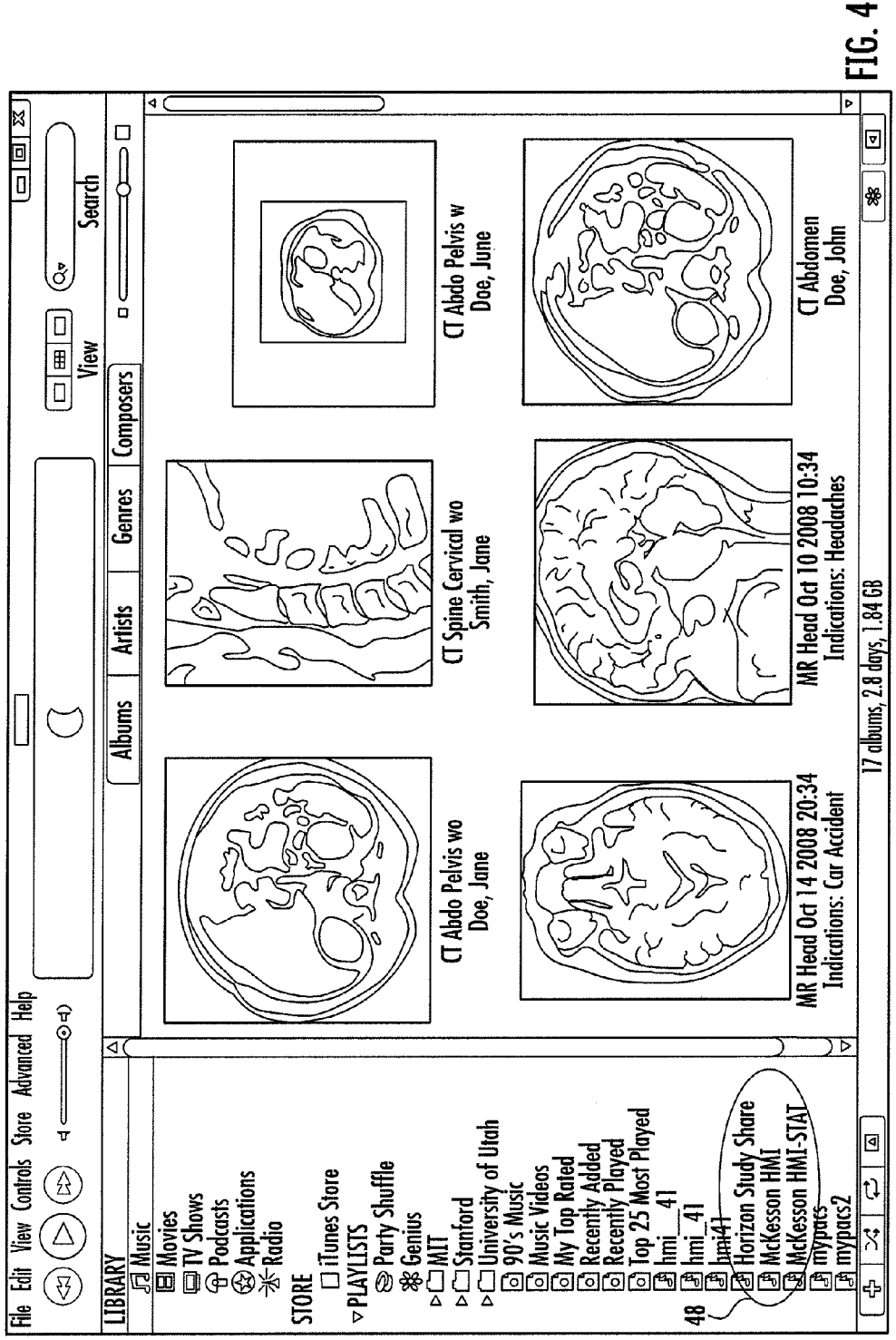
Figure 5:
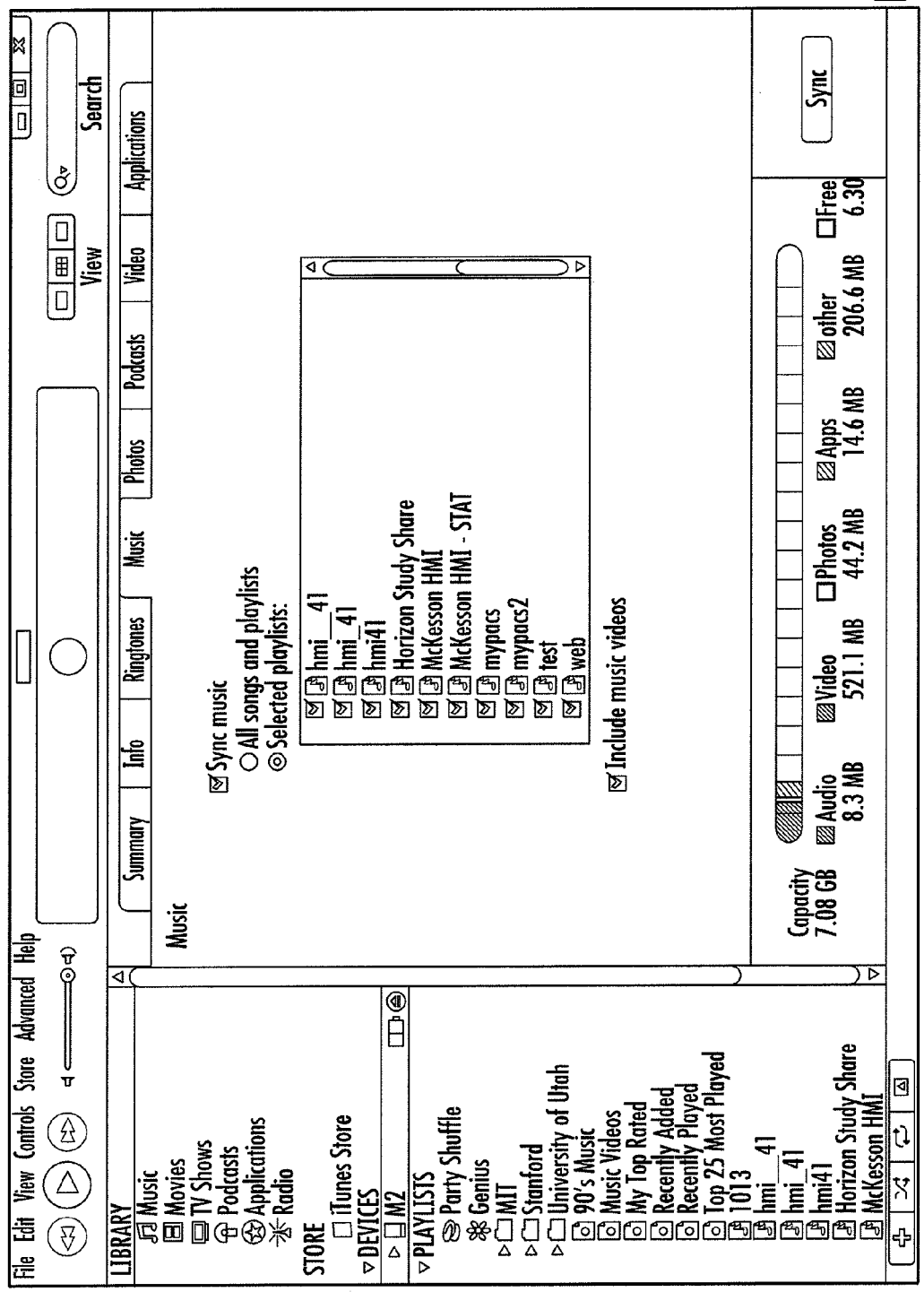
Figure 6A:
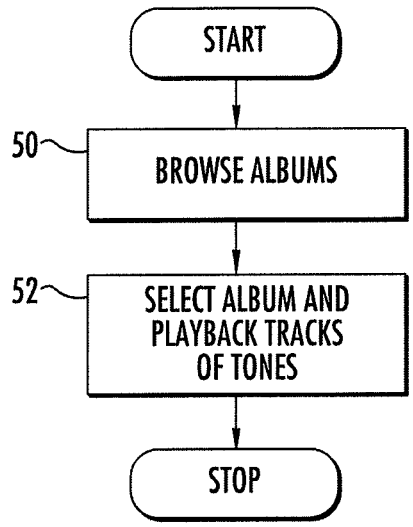
Figure 6B:
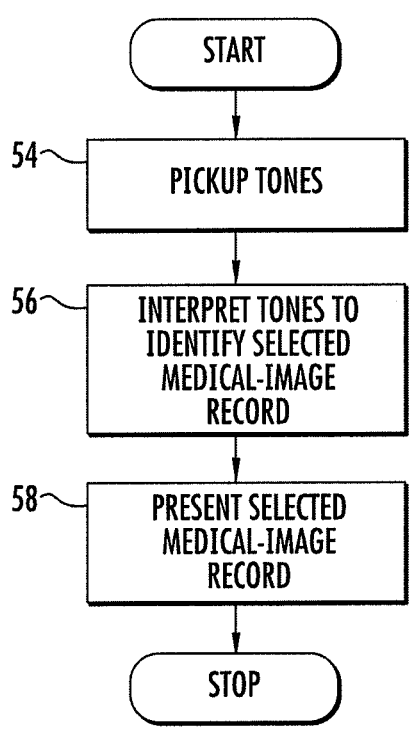
Figure 7:
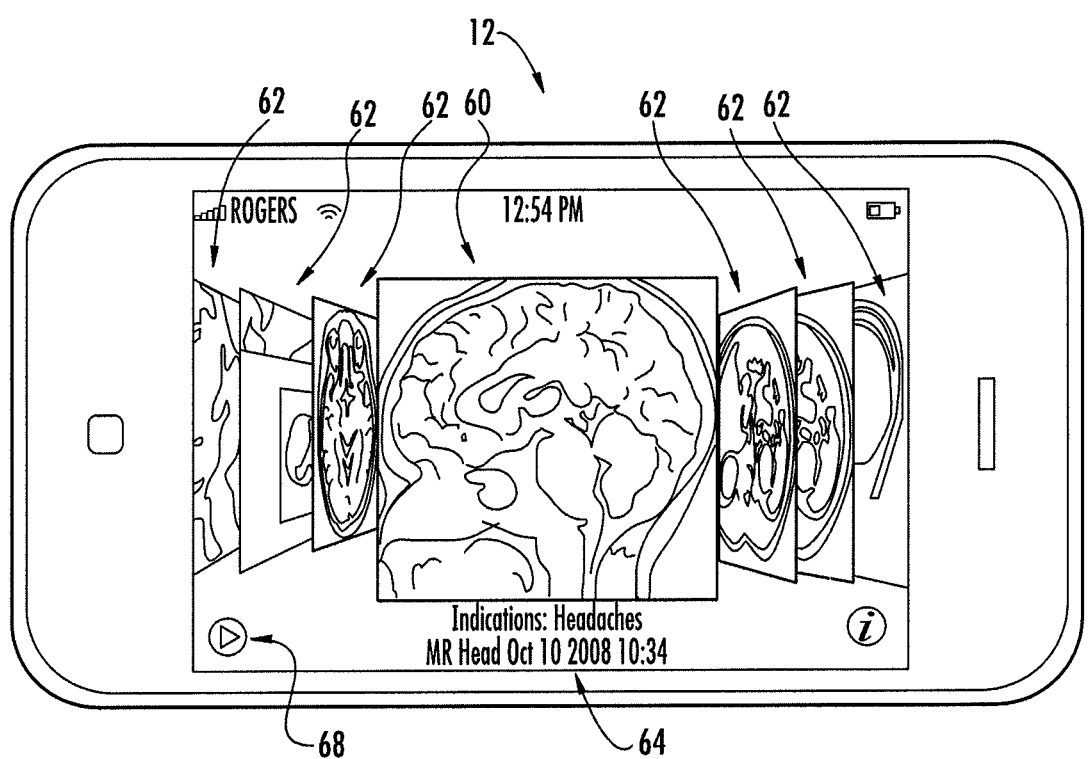
Figure 8A:
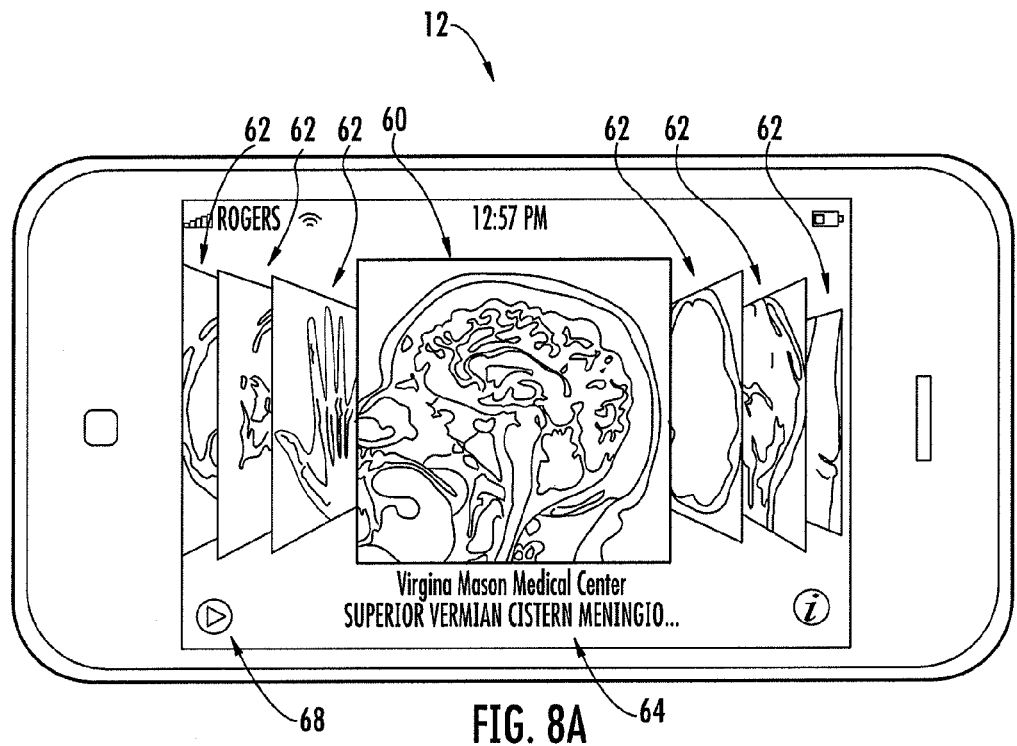
Figure 8B:
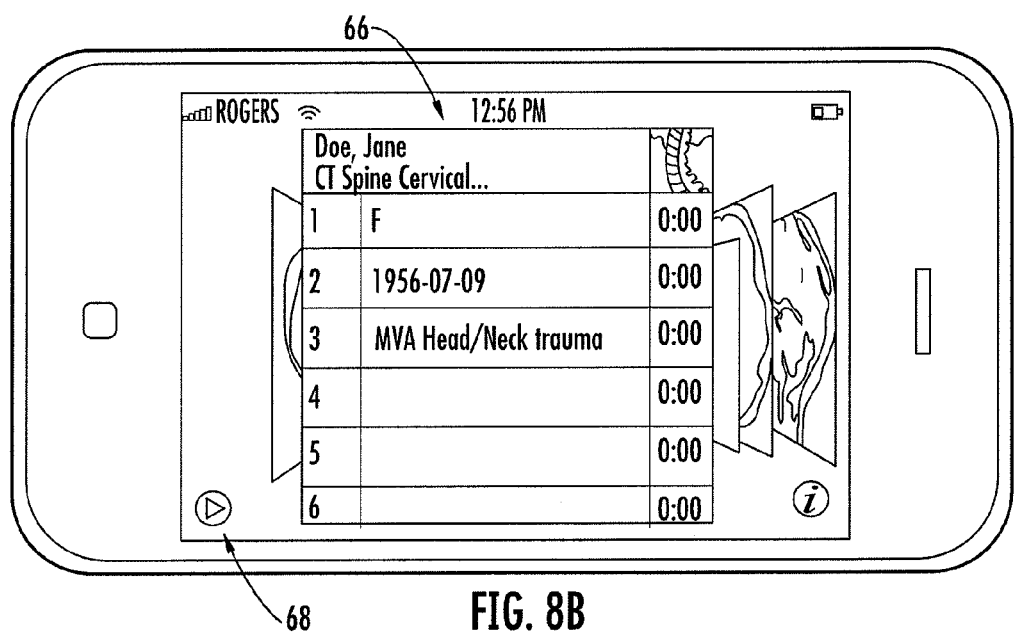

Having thus described the invention in general terms, reference will now be made to the accompanying drawings, which are not necessarily drawn to scale, and wherein:

FIG. 1 is a schematic block diagram of a system configured to operate in accordance with exemplary embodiments of the present invention;

FIG. 2 is a schematic block diagram of an apparatus configured to operate as a media player, computing apparatus or server apparatus, in accordance with embodiments of the present invention;

FIG. 3 is a flowchart illustrating various steps in a method of generating an "album" for a separate multimedia object, according to exemplary embodiments of the present invention, where the album may include a collection of audio tones identifying that object;

FIGS. 4 and 5 illustrate exemplary displays of a user interface of a media manager/player application that may manage albums created according to exemplary embodiments of the present invention;

FIGS. 6a and 6b are flowcharts illustrating various steps in a method of browsing and selecting a multimedia object (e.g., medical-image record) for presentation, according to one exemplary embodiment of the present invention; and FIGS. 7, 8a and 8b illustrate exemplary displays of a user interface of a media player for browsing and selecting an album, according to exemplary embodiments of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, references may be made herein to directions and orientations including vertical, horizontal, diagonal, right and left; it should be understood, however, that any direction and orientation references are simply examples and that any particular direction or orientation may depend on the particular object, and/or the orientation of the particular object, with which the direction or orientation reference is made. Like numbers refer to like elements throughout.

Referring to FIG. 1, a system 10 for browsing and selecting a multimedia object includes one or more media players 12 and computing apparatuses 14, and may further include one or more server apparatuses 16. The media player, computing apparatus and/or server apparatus can comprise any one or more of a number of different entities, devices or the like configured to operate in accordance with embodiments of the present invention. In this regard, one or more of the media player, computing apparatus or server apparatus can comprise, include or be embodied in one or more processing elements, such as one or more of a laptop computer, desktop computer, server computer or the like. Additionally or alternatively, one or more of the media player, computing apparatus or server apparatus can comprise, include or be embodied in one or more portable electronic devices, such as one or more of a portable music player, mobile telephone, portable digital assistant (PDA) or the like. More particularly, for example, the media player may comprise any of a number of legacy media players, such as the iPod or iPhone manufactured by Apple, the Zune manufactured by Microsoft, the Zen manufactured by Creative Technology or the like.

The media player 12 is configured to directly and/or indirectly communicate with the computing apparatus 14 and/or server apparatus 16. The media player, computing apparatus and/or server apparatus can be configured to communicate with one another in accordance with any of a number of wireline or wireless communication or networking techniques. Examples of such techniques include, without limitation, Universal Serial Bus (USB), radio frequency (RF), Bluetooth (BT), infrared (IrDA), any of a number of different cellular (wireless) communication techniques such as any of a number of 2G, 2.5G or 3G communication techniques, local area network (LAN), wireless LAN (WLAN) techniques or the like. In accordance with various ones of these techniques, the media player, computing apparatus and/or server apparatus can be coupled to and configured to communicate across one or more networks 18. The network(s) can comprise any of a number of different combinations of one or more different types of networks, including data and/or voice networks. For example, the network(s) can include one or more data networks, such as a LAN, a metropolitan area network (MAN), and/or a wide area network (WAN) (e.g., Internet), and include one or more voice networks, such as a public-switched telephone network (PSTN). Although not shown, the network(s) may include one or more apparatuses such as one or more routers, switches or the like for relaying data, information or the like between the media player, computing apparatus and/or server apparatus.

More particularly, as explained below, the media player 12 may include a speaker 20 or other audio output component configured to output audio tones representative of an identifier of a separate multimedia object selected by the media player or user of the media player. The computing apparatus 14, then, may include a microphone 22 or other audio sensor configured to pickup the audio tones and convert the audio tones to corresponding signals. The computing apparatus may be configured to interpret the corresponding signals (or more generally the audio tones) to perform a predefined action associated with the respective tones. As shown and described herein, the predefined action may be to identify and present the selected multimedia object; although it should be understood that the computing apparatus may be directed to perform any of a number of other predefined actions associated with the respective audio tones. Also, although the multimedia objects shown and described herein may comprise medical-image records, it should be understood that the multimedia objects may comprise any of a number of different multimedia objects (e.g., text, audio, video or combinations of text, audio or video) related or directed to any of a number of different topics or subjects.

Referring now to FIG. 2, a block diagram of an apparatus configured to operate as a media player 12, computing apparatus 14 and/or sever apparatus 16 is shown in accordance with exemplary embodiments of the present invention. Although shown as separate entities, in some embodiments, one or more entities may support one or more of a client, healthcare provider, primary payer, administrator and sponsor, logically separated but co-located within the entit(ies). For example, a single apparatus may support a logically separate, but co-located, computing apparatus and server apparatus.

The apparatus configured to operate as a media player 12, computing apparatus 14 and/or sever apparatus 16 includes various means for performing one or more functions in accordance with exemplary embodiments of the present invention, including those more particularly shown and described herein. It should be understood, however, that one or more of the entities may include alternative means for performing one or more like functions, without departing from the spirit and scope of the present invention. More particularly, for example, as shown in FIG. 2, the apparatus can include a processor 24 connected to a memory 26. The memory can comprise volatile and/or non-volatile memory, and typically stores content, data or the like. In this regard, the memory may store one or more software applications 28, instructions or the like for the processor to perform steps associated with operation of the apparatus in accordance with embodiments of the present invention. The memory may also store content transmitted from, and/or received by, the apparatus. As described herein, the software application(s) may each comprise software operated by the respective apparatuses. It should be understood, however, that any one or more of the software applications described herein may alternatively be implemented by firmware, hardware or any combination of software, firmware and/or hardware, without departing from the spirit and scope of the present invention.

In addition to the memory 26, the processor 24 can also be connected to at least one interface or other means for displaying, transmitting and/or receiving data, content or the like, such as in accordance with USB, RF, BT, IrDA, WLAN, LAN, MAN, WAN (e.g., Internet), PSTN techniques or the like. In this regard, the interface(s) can include at least one communication interface 30 or other means for transmitting and/or receiving data, content or the like. In addition to the communication interface(s), the interface(s) can also include at least one user interface that can include one or more earphones and/or speakers (e.g., speaker 20), a display 32, and/or a user input interface 34. The user input interface, in turn, can comprise any of a number of devices allowing the apparatus to receive data from a user, such as a microphone (e.g., microphone 22), a keypad, a touch-sensitive surface (integral or separate from a display 32), a joystick, or other input device.

Many legacy media players, such as Apple's iPod or iPhone, Microsoft's Zune, Creative's Zen or the like, store and playback digital audio tracks (which may be stored as audio files), which may be organized into albums or collections of related audio tracks. Each of these albums (and optionally each track) may have an associated cover art or image representative of the album, and from which the album may be identified. Users of a media player, then, may locate an album or track of an album by browsing through the cover art for the albums stored by the player, and from the located album select a desired track for playback by the player.

Exemplary embodiments of the present invention extend use of these media players to permit browsing and selection of multimedia objects (e.g., medical-image records) stored external to the respective media players. According to exemplary embodiments of the present invention, in addition to or in lieu of storing conventional audio tracks organized in albums having associated cover art, a media player may store "albums" associated with externally-stored medical-image records, where each "album" has an associated image representative of a respective medical-image record. These "albums" may be browsed, searched and selected in manners similar to those provided for conventional audio albums, such as by browsing through the associated cover art to select an image associated with a desired album (or rather a desired medical-image record). And as the records are stored external to the media player, the system of exemplary embodiments of the present invention may maintain security measures that may be applied at a computing apparatus or server from which the record may be accessed.

Each of the "albums" of exemplary embodiments of the present invention may comprise a collection of audio tracks each of which is an audio tone. The tones form a collection of audio tones representative of an identifier of a separate medical-image record associated with the respective album. When played back by the media player in proximity to a computing device, the computing device may pickup the audio tones and interpret those tones to identify the respective medical-image record. The computing device may then retrieve the medical-image record from local storage for presentation to the user, or may communicate with a server or other computing device for retrieving the medical-image record for presentation to the user.

Reference is now made to FIG. 3, which illustrates various steps in a method of generating an "album" according to exemplary embodiments of the present invention, where the album may include a collection of audio tones identifying a separate medical-image record. As shown and explained herein, the method of generating an album may be carried out by a media player 12, a computing apparatus 14 or a server apparatus 16. As shown at block 36, the method may include selecting a medical-image record (multimedia object) for which to generate an album. Album cover art (i.e., one or more images) may then be generated for the album, as shown at block 38. The album cover art may be generated in any of a number of different manners, such as by generating one or more thumbnail images of one or more images in the medical-image record. The album cover art may be formatted in a number of different manners, such as in any of a number of image formats including GIF, JPEG, PNG, TIFF, BMP or the like.

Before, after or as the album cover art is generated, the method may include generating audio tracks of audio tones representing an identifier (e.g., alpha-numeric identifier) of the medical-image record, as shown at block 40. These tones may be generated in any of a number of different manners, but in one exemplary embodiment, are generated as dual-tone multi-frequency (DTMF) tones in which tones are differentiated from one another in their frequencies (or combinations of frequencies). Similarly, the audio tracks may be generated in any of a number of different formats playable by a media player 12, such as AAC WAV, FLAC, APE, WMA, MP3, MP4 or the like.

According to exemplary embodiments of the present invention, medical-image records may have respective, associated identifiers made up of characters such as numbers, letters and/or symbols, each of which has a respective, associated tone. The audio tracks may then be generated such that each track includes one or more tones associated with one or more characters of the medical-image record identifier, and such that the tracks are ordered consistent with the order of their representative characters of the identifier. In addition, the tracks may be formatted to facilitate their being recognized by a computing apparatus 14 as corresponding to interpretable audio tones, and may be formatted in any of a number of different manners. For example, the first track of the album may include a designated start tone (e.g., DTMF *) prepended to the respective tone, and/or the last track of the album may include a designated end tone (e.g., DTMF #) suffixed to the respective tone. As another example, in addition to start and end tones, one or more delimiter tones (e.g., DTMF A) may be added between each tone representing a character of the record identifier. And in yet another example, the complete album length (e.g, number of tracks), or the length/size of the record identifier may be added at a designated location in the sequence of tones (e.g., at the beginning or end).

Consider, for example, an instance in which the selected medical-image record has the identifier: 58764. In such an instance, considering one track per tone of the identifier, and one tone per character, the tracks may be generated as follows:

Track 1: [DTMF *, DTMF 5]
Track 2: [DTMF 8]
Track 3: [DTMF 7]
Track 4: [DTMF 6]
Track 5: [DTMF 4, DTMF #]

where [DTMF x] represents the DTMF tone associated with character x. In a similar example, the start and end tones may themselves be generated as separate tracks, leading in this case to the following:

Track 1: [DTMF *]
Track 2: [DTMF 5]
Track 3: [DTMF 8]
Track 4: [DTMF 7]
Track 5: [DTMF 6]
Track 6: [DTMF 4]
Track 7: [DTMF #]

where [DTMF x] represents the DTMF tone associated with character x.

Although shown and described in the context of one track per tone of the identifier (or two tones per track if including the start and end tones as part of the first and last tracks), and one tone per character, a track may include more than one tone (may include all of the tones representative of the record identifier), or a tone may represent more than one character of a record identifier.

As or after the audio tracks are generated, the audio tracks may be tagged with metadata (or in other words, metadata tags may be added to the tracks) including one or more pieces of information related to the respective tracks or the album, as shown in block 42. These metadata tags may be formatted according to any of a number of formats, such as ID3v1, ID3v2, APEv1, APEv2 or the like. Traditionally, metadata tags for a digital audio track may include album cover art as well as fields for information such as the track's title, artist, album, speed and/or genre. According to exemplary embodiments of the present invention, the metadata tags for the tracks of an album may include the generated cover art for that album or for respective tracks of that album, and fields for information related to the medical-image record. For example, the album and artist fields for all of the tracks of the album may include information denoting to what the medical-image record pertains, and identify the patient (which may or may not include complete patient information for privacy reasons) to which the medical-image record is directed (i.e., the subject to which the multimedia object is directed). The title field for each track of an album, then, may include a respective, different piece of information related to the record or the patient.

To further illustrate this aspect, consider the following example of medical-image record 58764, which is a CT scan of a female (F) patient, Farah Chaplin, born Jul. 9, 1956, and who suffered head/neck trauma resulting from a motor vehicle accident (MVA):

Album: CT Spine Cervical wo
Artist: Chaplin, Farah
F: [DTMF *, DTMF 5]
1956-07-09: [DTMF 8]
MVA Head/Neck trauma: [DTMF 7]
: [DTMF 6]
: [DTMF 4, DTMF #]

In the preceding, the metadata tags of all the tracks of the album may include the album and artist fields identifying the CT scan and patient's name, and the tags of each of the first three tracks may include the title fields identifying the patient's sex, birth date and medical condition, respectively. The tags for the remaining two tracks may include the title fields identifying other information related to the record or patient, or may be left blank (as above).

The above process of selecting a medical-image record, generating album cover art, generating audio tracks, and tagging the audio tracks may be repeated for any number of medical-image records to create a collection of albums for a collection of medical-image records, as shown in block 44, and again at blocks 36-42. After creating each album, or after creating a collection of albums, the albums and their respective tracks may be transferred to a media player, as shown at block 46. The albums may be transferred to the media player in accordance with any of a number of different wireline or wireless techniques, such as any of those identified above, and may be pushed or pulled to the media player as desired. In a more particular exemplary embodiment, the albums may be managed by a media manager/player application operating on a computing apparatus 14, such as a computing apparatus from which the albums are generated. One example of such an application is Apple's iTunes application, shown in FIG. 4 including a library of a number of albums created according to exemplary embodiments of the present invention. In such instances, as shown in FIG. 5, the media manager/player application may be configured to synchronize its library and audio organization with that stored by a media player, thereby transferring the albums to the media player.

In instances in which the media manager/player application of the computing apparatus 14 or of the media player 12 itself permit organizing one or more albums in playlists, these playlists can be utilized to group similar albums, thereby allowing another manner of sorting medical-image records. As shown at 48 of FIG. 4, for example, one playlist (e.g., "McKesson HMI—STAT") could be utilized to organize critical cases requiring immediate attention by a user, another playlist (e.g., "McKesson HMI") could be utilized to organize cases requiring attention in due course, and yet another playlist (e.g., "Horizon Study Share") could be utilized to organize cases used for other purposes such as for reference or other teaching.

Regardless of exactly how the albums are transferred to the media player 12, the media player may store the respective albums for browsing and selection by a user to select an album, and thus select a medical-image record for presentation. Referring now to FIGS. 6a and 6b, a method of browsing and selecting a medical-image record for presentation according to one exemplary embodiment of the present invention is presented. As shown, the method includes a user of the media player directing the media player to present a user interface for browsing a collection of albums at least one of which is an album generated according to exemplary embodiments of the present invention (other albums of which may be traditional albums of music or other audio tracks).

The user interface of the media player 12 may enable the user to browse the albums in any of a number of different manners, such as in a list with or without their associated cover art, or in a three-dimensional view of album cover art (e.g., Cover Flow, MediaFlow, PictureFlow, etc.). One particular example of a three-dimensional view of album cover art is Cover Flow included with Apple's iPod and iPhone, as shown in FIGS. 7, 8a and 8b with respect to an iPhone media player (including a touch-sensitive display for scrolling through albums). As shown, the cover art for a plurality of albums may be presented and through which the user may scroll. One of the presented album cover art (shown as album cover art 60) may be positioned or shown in a particular view denoting that album as being currently selectable, relative to other presented album covert art (shown as album cover art 62). The user may then scroll between the presented album cover art (with cover art not otherwise fitting within the user interface coming into display as the user scrolls through the presented cover art) moving different album cover art into the position or particular view denoting the respective cover art as being selectable.

As the user browses the albums, in addition to the album cover art, the user interface may present any of a number of different pieces of information 64 regarding the album and/or its tracks to the user, such as the album's title and the artist for one or more (if not all) of the tracks of the album. As indicated above, this information may be included within the metadata tags of the album's tracks, and may be denoting to what the medical-image record pertains, and may be identifying the patient to which the medical-image record is directed (i.e., the subject to which the multimedia object is directed). As shown in FIG. 7, for example, the currently-selectable album cover art may be presented with a symptom (Indications: Headaches) of the patient to which the respective medical-image record is directed, and the type of medical-image record and date of its creation (MR Head Oct 10 2008 10:34), in the title and artist fields, respectively, of the metadata tags of some if not all of the tracks of the album. And as shown in FIG. 8a, for example, the currently-selectable album cover art may be presented with the location (Virginia Mason Medical Center) at which the respective medical-image record was created, and a condition (Superior Vermian Cistern Meningioma) of the patient to which the respective medical-image record is directed.

Further, as the user browses the albums, the user may select an album (e.g., the currently-selectable album) to view information regarding the tracks of the album. As indicated above, the tracks of the album generated according to exemplary embodiments of the present invention are audio tones representative of an identifier of a medical-image record. But as also indicated above, the metadata tags of these tracks may include, in a title field for each track, a respective, different piece of information related to the record or the patient. Continuing the above example of an album for medical-image record 58764 for patient Farah Chaplin, FIG. 8b illustrates an example of the user interface in which the user has selected the respective album to view its track information 66, and more particularly its tracks' respective titles.

Once the user identifies a desired album from the user interface of the media player 12, the user may select the album for playback, as shown in block 52 of FIG. 6a. The album may be selected in a number of different manners, such as by actuating a play button or control from the user interface (shown as button 68 in the user interface shown in FIGS. 7, 8a and 8b), or by selecting the first track of the album from the track information 66 presented for the respective album. In response to such a selection of an album, the media player may playback its tracks of tones, outputting the tones via its speaker 20 or other audio output component.

As explained above, an album generated according to exemplary embodiments of the present invention may have associated cover art, which may be included within the metadata tags of the tracks of the respective album. As each track has its own metadata tag, however, one or more tracks of an album may have different associated cover art than one or more other tracks of the album—the cover art for a track being included within the metadata tag for the respective track. In such instances, the cover art for one of the tracks (e.g., the first track) may be presented as the user scrolls through cover art for different albums. And when the media player 12 plays back the tracks of an album for which the tracks include different cover art, the media player may be configured to display the cover art for the tracks as those tracks are played back, changing the cover art as tracks with different cover art are played back.

As the media player 12 outputs the audio tracks for the selected album, a computing apparatus 14 may pickup the audio tracks via its microphone 22 or other audio sensor, as shown in block 54 of FIG. 6b. This computing apparatus, or rather its microphone, may be operating in an area proximate the media player playing back the audio tracks, or may be operating in another area and in a manner by which the played back tracks may be picked up by its microphone.

As the microphone 22 of the computing apparatus 14 picks up the played back audio tracks from the media player 12, the microphone may convert the audio tones to corresponding signals. The computing apparatus may interpret these signals (or more generally the audio tones) to identify the selected album, or rather the medical-image record associated with the selected album, as shown in block 56 of FIG. 6b. Continuing the above example, consider an instance in which the media player plays back the following audio tracks: [DTMF *, DTMF 5], [DTMF 8], [DTMF 7], [DTMF 6] and [DTMF 4, DTMF #]. In such an instance, the computing apparatus may interpret the tone DTMF * and DTMF # as indicating the start and end of a record identifier, and interpret DTMF 5, DTMF 8, DTMF 7, DTMF 6 and DTMF 4 as representing the record identifier 58764.

On interpreting the tones to identify the selected album, and thus the selected medical-image record, the computing apparatus 14 may present the selected medical-image record to a user, such as by displaying or playing the content of the selected medical-image record, as shown in block 58 of FIG. 6b. The computing apparatus may retrieve the selected medical-image record from local storage. Alternatively, the computing apparatus may communicate with another apparatus, such as another computing apparatus or a server apparatus 16, to pull the selected medical-image record from the respective other apparatus (storing the respective record).

According to one aspect of the present invention, all or a portion of the media player 12, computing apparatus 14 and/or server apparatus 16 of exemplary embodiments of the present invention, generally operate under control of a computer program. The computer program for performing the methods of exemplary embodiments of the present invention may include one or more computer-readable program code portions, such as a series of computer instructions, embodied or otherwise stored in a computer-readable storage medium, such as the non-volatile storage medium.

FIGS. 3, 6a and 6b are flowcharts reflecting methods, systems and computer programs according to exemplary embodiments of the present invention. It will be understood that each block or step of the flowcharts, and combinations of blocks in the flowcharts, may be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (e.g., hardware) create means for implementing the functions specified in the block(s) or step(s) of the flowcharts. These computer program instructions may also be stored in a computer-readable memory that may direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, may be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. It should therefore be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising a processor and a memory storing executable instructions that in response to execution by the processor cause the apparatus to at least perform the following:
   selecting or receiving selection of a multimedia object including an associated identifier, the multimedia object being presentable by a computing apparatus;
   generating one or more audio tracks of audio tones representing the identifier, the one or more audio tracks collectively forming an album for the multimedia object;
   directing a transfer of the album including the one or more audio tracks to a media player for subsequent playback of the one or more audio tracks, the media player being separate from the computing apparatus, the multimedia object being stored external to the media player and accessible to the computing apparatus, the computing apparatus being configured to pickup the audio tones of the one or more audio tracks during the playback, interpret the audio tones to identify the multimedia object from the identifier represented by the audio tones, and access and present the identified multimedia object; and
   adding, to each of the one or more audio tracks, a metadata tag including information related to the multimedia object,
   wherein directing a transfer of the album includes directing a transfer of the one or more audio tracks and added metadata tags to the media player, the media player thereby being enabled to present a user interface displaying the information included in the tag to facilitate selection of the album by a user of the media player, selection of the album directing playback of the one or more audio tracks by the media player, and
   wherein the multimedia object comprises a medical-image record for a patient, wherein adding a metadata tag comprises adding, to each of the one or more audio tracks, a metadata tag including information related to the medical-image record or patient.

2. The apparatus of claim 1, wherein generating one or more audio tracks of audio tones comprises generating one or more audio tracks of dual-tone multi-frequency (DTMF) tones, each audio track including one or more DTMF tones.

3. The apparatus of claim 2, wherein the identifier comprises a plurality of characters, and wherein generating one or more audio tracks of DTMF tones comprises generating one or more audio tracks of DTMF tones each of which is associated with a character of the identifier.

4. A method comprising:
   selecting or receiving selection of a multimedia object including an associated identifier, the multimedia object being presentable by a computing apparatus;
   generating one or more audio tracks of audio tones representing the identifier, the one or more audio tracks collectively forming an album for the multimedia object;
   directing a transfer of the album including the one or more audio tracks to a media player for subsequent playback of the one or more audio tracks, the media player being separate from the computing apparatus, the multimedia object being stored external to the media player and accessible to the computing apparatus, the computing apparatus being configured to pickup the audio tones of the one or more audio tracks during the playback, interpret the audio tones to identify the multimedia object from the identifier represented by the audio tones, and access and present the identified multimedia object,
   wherein selecting or receiving selection of a multimedia object, generating one or more audio tracks, and directing a transfer of the album are performed by a processor configured to select or receive selection of the multimedia object, generate the one or more audio tracks, and direct the transfer of the album; and
   adding, to each of the one or more audio tracks, a metadata tag including information related to the multimedia object,
   wherein directing a transfer of the album includes directing a transfer of the one or more audio tracks and added metadata tags to the media player, the media player thereby being enabled to present a user interface displaying the information included in the tag to facilitate selection of the album by a user of the media player, selection of the album directing playback of the one or more audio tracks by the media player, and
   wherein the multimedia object comprises a medical-image record for a patient, wherein adding a metadata tag comprises adding, to each of the one or more audio tracks, a metadata tag including information related to the medical-image record or patient.

5. The method of claim 4, wherein generating one or more audio tracks of audio tones comprises generating one or more audio tracks of dual-tone multi-frequency (DTMF) tones, each audio track including one or more DTMF tones.

6. The method of claim 5, wherein the identifier comprises a plurality of characters, and wherein generating one or more audio tracks of DTMF tones comprises generating one or more audio tracks of DTMF tones each of which is associated with a character of the identifier.

7. A non-transitory computer-readable storage medium having computer-readable program code portions stored therein that in response to execution by a processor, cause an apparatus to at least perform the following:

selecting or receiving selection of a multimedia object including an associated identifier, the multimedia object being presentable by a computing apparatus;

generating one or more audio tracks of audio tones representing the identifier, the one or more audio tracks collectively forming an album for the multimedia object;

directing a transfer of the album including the one or more audio tracks to a media player for subsequent playback of the one or more audio tracks, the media player being separate from the computing apparatus, the multimedia object being stored external to the media player and accessible to the computing apparatus, the computing apparatus being configured to pickup the audio tones of the one or more audio tracks during the playback, interpret the audio tones to identify the multimedia object from the identifier represented by the audio tones, and access and present the identified multimedia object; and adding, to each of the one or more audio tracks, a metadata tag including information related to the multimedia object, wherein directing a transfer of the album includes directing a transfer of the one or more audio tracks and added metadata tags to the media player, the media player thereby being enabled to present a user interface displaying the information included in the tag to facilitate selection of the album by a user of the media player, selection of the album directing playback of the one or more audio tracks by the media player, and wherein the multimedia object comprises a medical-image record for a patient, wherein adding a metadata tag comprises adding, to each of the one or more audio tracks, a metadata tag including information related to the medical-image record or patient.

8. The computer-readable storage medium of claim 7, wherein generating one or more audio tracks of audio tones comprises generating one or more audio tracks of dual-tone multi-frequency (DTMF) tones, each audio track including one or more DTMF tones.

9. The computer-readable storage medium of claim 8, wherein the identifier comprises a plurality of characters, and wherein generating one or more audio tracks of DTMF tones comprises generating one or more audio tracks of DTMF tones each of which is associated with a character of the identifier.

* * * * *